April 6, 1954  G. LORUSSO  2,674,131
TURNTABLE DRIVING MEANS FOR PHONOGRAPHS
Filed May 12, 1951  2 Sheets-Sheet 2

INVENTOR.
Giuseppe Lorusso
BY

Patented Apr. 6, 1954

2,674,131

UNITED STATES PATENT OFFICE 2,674,131

TURNTABLE DRIVING MEANS FOR PHONOGRAPHS

Giuseppe Lorusso, Milan, Italy, assignor to Lesa Costruzioni Elettromeccaniche S. p. A., Milan, Italy, a firm Application May 12, 1951, Serial No. 226,085

Claims priority, application Italy February 21, 1951

4 Claims. (Cl. 74—200)

My present invention relates to driving means for phonographs' turntables and more particularly it relates to turntable driving means of the type provided with a transmission comprising a set of frictionally meshing pulley gears and provided with transmission ratio changing devices for setting the phonograph for the use of records requiring different speeds of revolution.

It is common practice in the production of high-grade phonographs or like talking machines of the type in which records are supported on and rotated by a turntable, to provide friction type transmitting devices for rotative connection of said turntable to a suitable source of rotative power and to provide devices for changing the rotative speed imparted to said turntable.

The main object of this my invention is to provide an improved and highly simplified mechanism of the above type which is adapted to drive the talking machine's turntable at the various and precisely defined speeds required to deal with records of different type on the standpoint of their own recording rotative speed.

Another object of this my invention is to provide an improved mechanism of the type described the operation of which mechanism would be easily performable and of a construction which would prevent and avoid any mistake in setting the apparatus at the desired speed operating condition.

A further object of this my invention is to provide a transmitting mechanism having the above features which is composed of few parts and is also inexpensive to make and reliable in operation.

A still further object of this my invention is to provide a transmitting mechanism having the above characteristics and in which connecting means are provided for joining together the parts and members which cooperate in the operation of playing records and which are removable for the actuation of speed change the features of which connecting means being so as to allow easy removal of said parts as requested for speed changing operation and also to make sure the connection between same parts and members when the apparatus is set for playing records.

I attain the above object substantially by providing a transmission comprising an idle pulley frictionally connected to a down-turned surface of to the turntable and to a small diameter driving pulley rotatively connected to the top end of a vertical motor shaft, and in which the said idle pulley is so springly supported on the apparatus frame that either said frictional connections are made sure, in combination with means allowing easy removal of said driving pulley from said motor shaft and easy substitution of another driving pulley in lieu thereof, said another driving pulley having different diameter as required to actuate a transmission of the desired different ratio.

In a preferred form of embodiment of an improved mechanism according to this my invention, the removable driving pulley is provided with at least two external cylindrical and coaxial surfaces, means being provided for connection of said driving pulley in a like number of different positions about the top end of motor shaft, so that any of said cylindrical surfaces can be frictionally, connected at will with said idle pulley i. e. a like number of different transmission ratios can be attained by correspondingly varying the diameter ratio between the down-turned surface of turnplate on which the said idle pulley is frictionally in mesh and the chosen surface of said driving pulley frictionally meshing with said idle pulley.

In a most preferred embodiment of the invention, the said driving pulley is removably connected by axial insertion on and around the top end of the motor, said top end being so diametrally dimensioned that the same can directly act as driving pulley of the smallest diameter required for driving the turnplate at its lowest required speed. Consequently, a transmitting mechanism according to this invention may provide as many transmission ratios as the number of external surfaces comprised in said removable driving pulley plus one.

As preferred means for connection of the removable driving pulley to the said top end of motor shaft I provide a small tubular member placed inside said pulley, said member being made of resilient material as rubber and the bore hole of said tubular member being so dimensioned that the said top end of motor shaft may be fitted thereinto upon exertion of a certain force.

For a better understanding of the invention and of the above and of other features and advantages which will appear as the disclosure proceeds, reference may be made to the following description of a preferred embodiment thereof illustrated in the accompanying drawings, in which:

Figure 3 is an exploded elevation view illustrating in enlarged scale the combination of the motor shaft top end and of the removable driving pulley, the latter being in part illustrated in sectional view.

Figure 1:
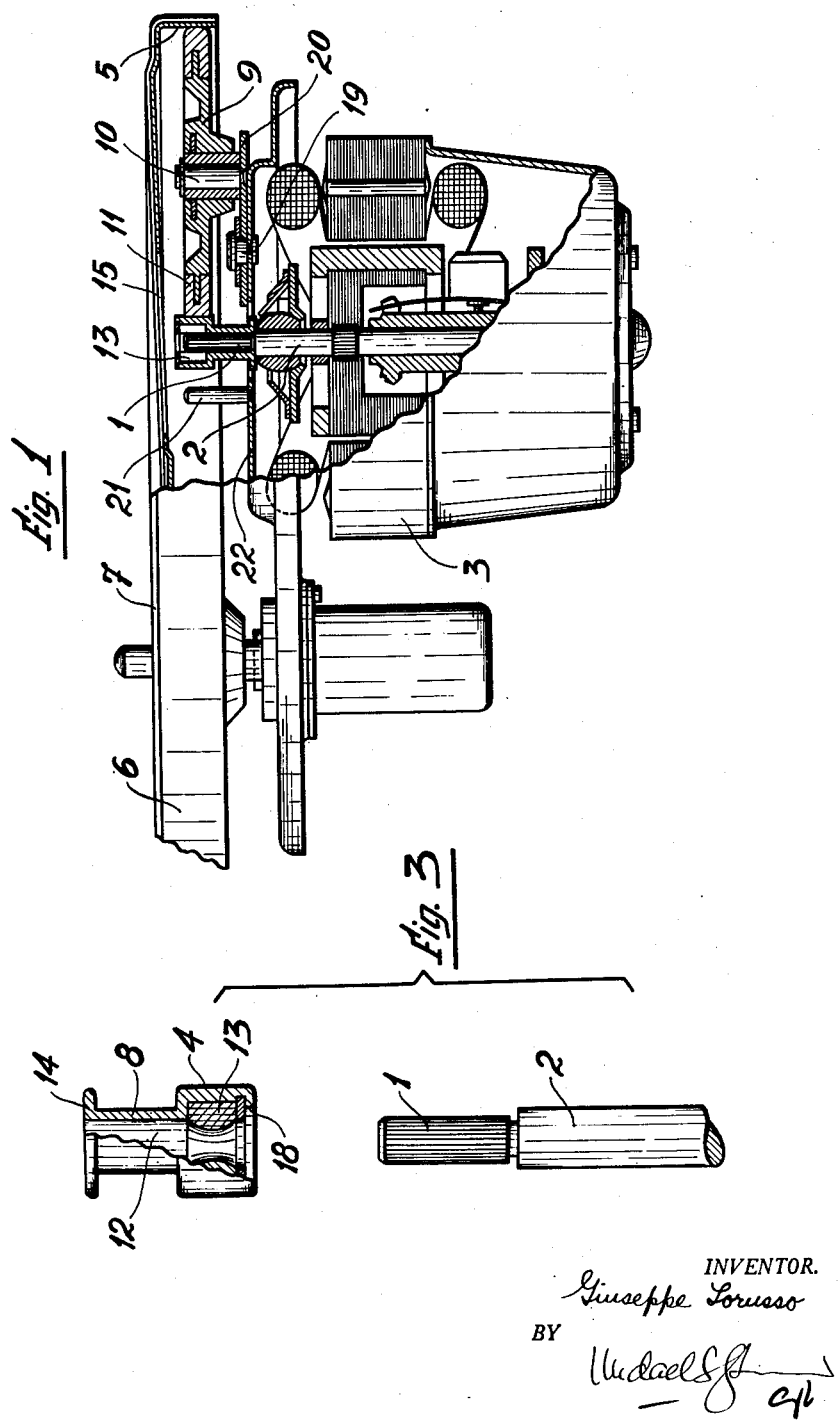
Figure 1 is a sectional elevation of a part of the apparatus comprising all parts and members pertinent to the transmitting mechanism, said sectional elevation being taken in the vertical planes comprising both motor and idle pulley shafts, and shown in Figure 2 by angle line 1—1—1.

In carrying the invention into effect according to one convenient mode, in a phonograph provided with an electric motor, with a set of transmitting gears frictionally connecting said motor to a turntable, and with a turntable freely rotatable around its shaft bearings, the transmission is actuated by the cooperation of a small driving pulley 4 connected to the top end 1 of the vertical shaft 2 of the motor 3, of an idle pulley 9 provided with a peripheric rubber coating 11, and of the turntable 7, the said idle pulley's peripheric coating 11 being frictionally in mesh with both said driving pulley 4 and with the inner surface 5 of the peripherical down-turned portion 6 of said turntable. The shaft 10 around which said idle pulley 9 freely rotates is borne by an arm 20 which can swing around its pivot 19, a conventional spring system (not shown) causing said arm to be so swung that said idle pulley is kept in contact with both driving pulley 4 and driven turntable 7's inner surface 5, the whole as substantially used in common practice of manufacture of phonographs of the type comprising friction gears for transmitting the rotative movements of motor shaft to turnplate.

According to this invention, the said small driving pulley 4 is removably mounted on said top end 1 of motor shaft 2 and it is provided with two outer cylindrical surfaces of different diameter, as clearly shown in Figure 3, in which the surface of greater diameter is indicated by same reference numeral 4 while the surface of lesser diameter is indicated by numeral 8. The said arm 20 is so constructed according to common practice in the art and pivotally mounted about its pivot 19 that its swinging movement is of sufficient magnitude for making sure the frictional meshing of said idle pulley with said small driving pulley either if the latter is so mounted on top end 1 of shaft 2 that the said major surface 4 is in mesh with said idle pulley or if the said small pulley is upsetly mounted, i. e. if the said minor surface 8 of it is in mesh with same idle pulley, and for making sure also the direct frictional meshing of said idle pulley with the bare surface of said top end 1 of shaft 2, when the said small driving pulley is removed.

The diameters of said top end 1, of surface 8 and of surface 4 of the said driving pulley are so calculated that through a transmission as actuated by meshing the said idle pulley with said top end and with the first or the second of said surfaces the said turntable may be driven at three desired different rotational speeds and, in the actual construction of the apparatus, at 33 R. P. M., 45 R. P. M. and 78 R. P. M., i. e. at the three different speeds required for playing records of the various types currently made.

It will be apparent from the foregoing that the calculation of said diameters is related to the actual rotative speed of the motor shaft, which speed is in turn related with the type of motor and the frequency of A. C. supplied to the latter.

Upon analysis in the well known manner, it can readily be shown that the desired R. P. M. speeds of turntable may be attained in an apparatus of the type described, comprising a motor the rotative speed of which is $n$ and comprising a turntable the diameter of inner surface 5 of which is $D$, by constructing a motor shaft the top end of which is being of diameter $d$ and by providing a removable driving pulley having a major surface 4 of diameter $d'$ and a minor surface of diameter $d''$, provided that $$\frac{n}{33}=\frac{D}{d}; \quad \frac{n}{45}=\frac{D}{d'}$$

and $$\frac{n}{78}=\frac{D}{d''}$$

respectively, i. e. by constructing driving surfaces related one to the others as values 33, 45 and 78 are, and by providing means allowing easy substitution of any of said surface with any other of same in meshing position with the said idle pulley, the diameter of the latter being immaterial, owing to the fact that the peripherical speed of driving surface in operation is equal to the peripherical speed of driven surface, both said surfaces being in frictional meshing with said idle pulley which acts as a transmitting medium of peripherical speed only.

In matter of structural features, the small driving pulley 4 is actuated in form of a little tubular member provided with two coaxial portions of different diameter and with an axial bore 12 in which the said top end 1 of shaft 2 may freely be inserted; the inner part of the major portion of said driving pulley forms an annular recess in which a tiny tubular member 13 of resilient material (rubber or plastics) is tightly fitted, said member 13 being kept in place by a spring ring 18 encased in an annular groove near the edge of said major portion of the small pulley or by any other suitable known means. The said tubular member 13 is shaped as shown in Figure 3 in particular, and the inner surface of it is noticeably inwardly convexed, when in its resting position, the minimum bore of it being noticeably of lesser diameter than the diameter of said top end 1 of motor shaft 2. As a consequence of the foregoing, the said small pulley requires a certain axial pressure for fitting about the said top end and for removal of same therefrom, the said resilient member 13 being noticeably pressed when the said top end is inserted thereinto. Said pressure is low enough for allowing easy insertion and removal of said small pulley, but largely sufficient for making sure rotative connection of pulley and shaft as required for the purpose of driving the turntable. The provision of longitudinal corrugations on the surface of said top end 1 ensures both the connection with the small driving pulley and the frictional meshing with the idle pulley when the said driving pulley is removed.

According to the invention, an opening 15 is provided on the turntable 7, through which opening the operator may easily take hold between his finger-tips of the said small pulley for removal and refitting the same in upset position, or for insertion of same about a small resting pole 21 vertically supported on frame plate 22 of the apparatus, when the transmission is actuated by direct contact of idle pulley with top end 1 of motor shaft. The handling of the small driving pulley is made easy by the presence of a little out-turned flange 14 formed at the end of minor portion 8 of said pulley.

Figure 2:
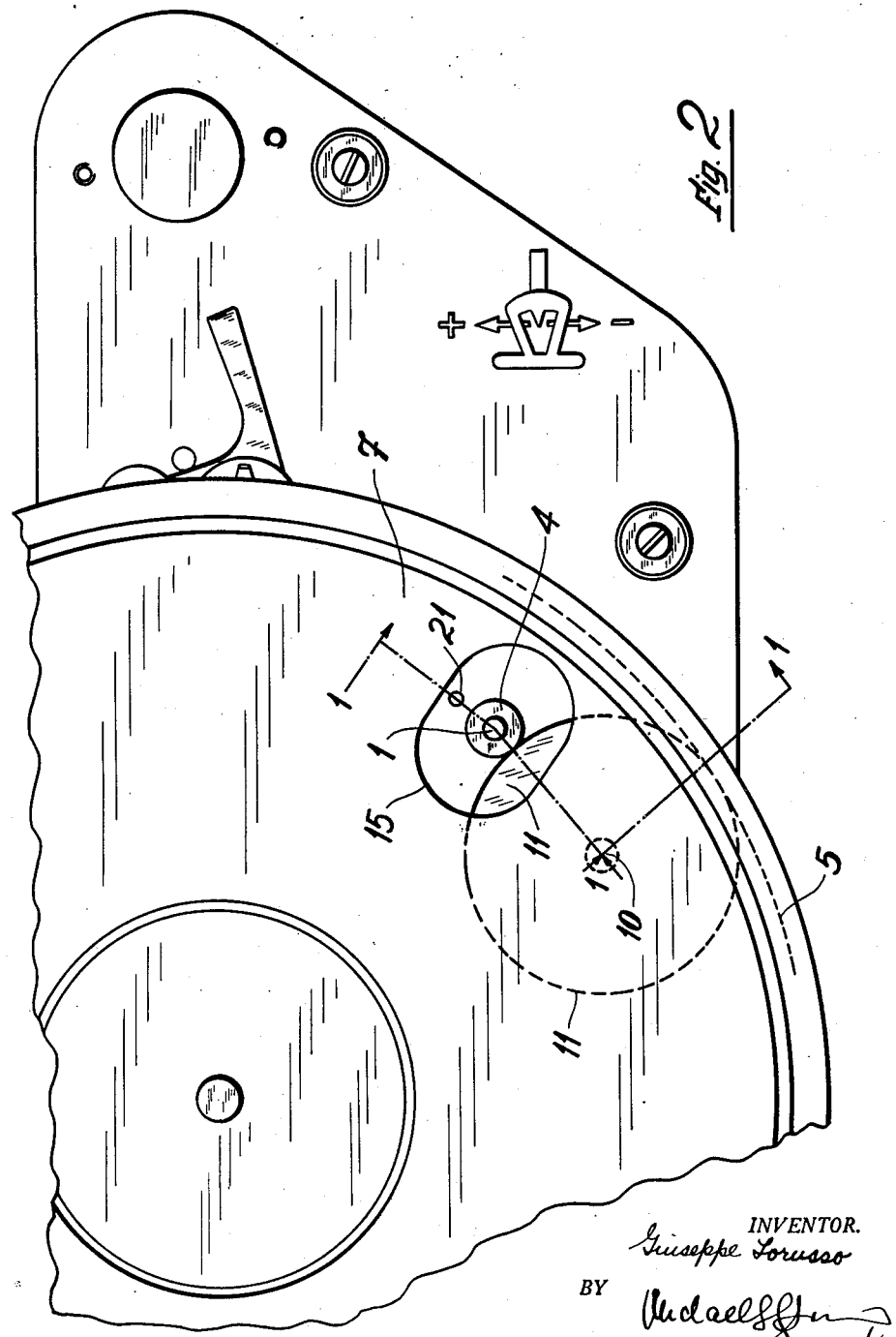
Figure 2 is a plan view of a part of a phonograph comprising the turnplate and its driving means.

From the foregoing it will be clearly understood the operation of an apparatus according to this invention, is as follows:

For example, supposing the apparatus set for playing records which are to be revolved at 78 R. P. M., i. e. supposing the apparatus set as shown in Figure 1, in which the major portion 4 of driving pulley is in frictional mesh with the idle pulley, and supposing that the operator is desirous to have the apparatus so set that the turntable will rotate at 45 R. P. M., said operator may easily attain said setting by rotating by hand the turntable until said opening 15 uncovers the small driving pulley (as shown in Figure 2), then by removing the latter from top end 1 of motor shaft 2 and then by refitting same pulley in place in upset position, i. e. in position as shown in Figure 3 in respect to said top end of shaft. As result of above said operations, the said idle pulley will next contact and be frictionally in meshing with portion 8 of said small driving pulley. By limiting the above said operation to the removal of said small driving pulley only, the setting of the apparatus to drive its turnplate at 33 R. P. M. is done. Insertion of the unused small driving pulley about the said resting pole 21 ensures the storage of said pulley in a nearby place of easy approach.

Alternately, an apparatus according to this invention, when set for driving records, at 33 R. P. M., i. e. when the top end of motor shaft thereof is in direct frictional mesh with its idle pulley, may easily be set in operative condition for driving records at 45 R. P. M. or at 78 R. P. M. by removing the said small pulley from its resting pole 21 and then by fitting same about said top end so positioned that its portion 8 of lesser diameter results on the upper part or on the lower part of the said pulley, respectively.

While there has been heretofore described what is at present considered the preferred embodiment of the invention, it will be obvious to those skilled in the art that various changes and modifications may be made therein without departing from the invention, and it is therefore aimed in the appended claims to cover all such modifications as fall within the true spirit and scope of the invention.

What I claim as novel and desire to have protected by Letters Patent is:

1. In a phonograph having a turntable, a motor for rotating said turntable and a set of frictionally meshing transmitting pulley gears for transmitting the motion of said motor to said turntable, the combination of means allowing the removal of one pulley comprised in said set of transmitting pulley gears from the shaft about which said pulley is borne and operatively connected, and of means admitting the contact of the adjacent pulley in frictional mesh with said removable pulley either with said removal pulley and with the portion of said shaft from which said removable pulley has been removed, said removable pulley being provided with an inner tubular member of resilient material the bore of which is dimensioned to fit with pressure about said portion of shaft.

2. In a phonograph having a turntable, a vertically placed motor for rotating said turntable and a set of frictionally meshing transmitting pulley gears for transmitting the motion of said motor to said turntable, a transmitting mechanism comprising, in combination, the vertical shaft of said motor, a small driving pulley removably mounted about the said shaft, an idle pulley in frictional mesh with said small driving pulley, a driven turntable rotatably supported about its central shaft and having an inner annular surface in frictional mesh with said idle pulley, spring means being provided for urging said idle pulley in contact with both said small driving pulley and said inner annular surface of turntable, the said driving pulley being provided with two coaxial external cylindrical surfaces of different diameter either of which can be alternately put in frictional meshing with said idle pulley, and with an internal tubular rubber member dimensioned to fit about the top end of said vertical shaft.

3. In a phonograph having a turntable, provided with an inturned cylindrical surface, a vertically placed electric motor for driving said turntable, a small driving pulley removably mounted about the top end of vertical shaft of said motor, and idle pulley in frictional meshing with said driving pulley and with the said cylindrical surface of turntable, said driving pulley having two coaxial cylindrical surfaces of different diameter either of which can be alternately put in frictional meshing with said idle pulley, a top end of motor vertical shaft which can be also put in frictional meshing with said idle pulley upon removal of said removable driving pulley, the said two coaxial surfaces of said driving pulley and the surface of said top end of shaft being so dimensioned that their own diameters are related one to the others as the values 33, 45 and 78 are.

4. In a phonograph having a turntable provided with an inturned cylindrical surface a vertically placed electric motor for driving said turntable, a small driving pulley removably mounted about the top end of vertical shaft of said motor, an idle pulley in frictional meshing with said driving pulley and with the said cylindrical surface of turntable, the said driving pulley and idle pulley being arranged beneath the said turntable, the provision of an opening on the upper surface of said turntable, the said opening being arranged so as to uncover said driving pulley for removal of same, said driving pulley having two coaxial cylindrical surfaces of different diameter either of which can be alternately put in frictional meshing with said idle pulley, and of a top end of motor vertical shaft which can be also put in frictional meshing with said idle pulley upon removal of said removable driving pulley, the said two coaxial surfaces of said driving pulley and the surface of said top end of shaft being so dimensioned that their own diameters are related one to the others as the values 33, 45 and 78 are.

References Cited in the file of this patent

UNITED STATES PATENTS

| Number | Name | Date |
| --- | --- | --- |
| 1,746,599 | Mahan | Feb. 11, 1930 |
| 1,813,502 | Madsen | July 7, 1931 |
| 2,555,643 | Harrison | June 5, 1951 |

FOREIGN PATENTS

| Number | Country | Date |
| --- | --- | --- |
| 477,056 | France | June 26, 1915 |